United States Patent [19]

Bywood et al.

[11] 3,873,519
[45] Mar. 25, 1975

[54] PREPARATION OF ESTERS OF PENICILLANIC ACIDS

[75] Inventors: Roy Bywood, Ulverston; John Charles Clayton, Harrow; George Ross Taylor, Grange over Sands; Herbert James White, Chalfont St. Giles, all of England

[73] Assignee: Glaxo Laboratories Limited, Greenford, England

[22] Filed: Jan. 20, 1972

[21] Appl. No.: 219,557

Related U.S. Application Data

[63] Continuation-in-part of Ser. No. 37,879, May 15, 1970, abandoned.

[30] Foreign Application Priority Data

May 20, 1969 United Kingdom............... 25746/69
July 18, 1969 United Kingdom............... 36385/69

[52] U.S. Cl.............................. 260/239.1, 424/271
[51] Int. Cl............................................ C07d 99/22
[58] Field of Search................................ 260/239.1

[56] References Cited
UNITED STATES PATENTS 3,632,578  1/1972  Chauvette...................... 260/243 C
3,676,437  7/1972  Siddons......................... 260/243 C

FOREIGN PATENTS OR APPLICATIONS 727,481  4/1955  United Kingdom............. 260/239.1

Primary Examiner—Nicholas S. Rizzo
Attorney, Agent, or Firm—Bacon & Thomas

[57] ABSTRACT

An improved process for the preparation of esters of penicillanic acids comprises (A) contacting a penicillanic acid salt with a haloformic acid ester of an alcohol or phenol in an inert, substantially anhydrous organic solvent at a relatively low temperature in the substantial absence of excess base until the desired mixed anhydride is obtained and then (B) effecting decarboxylation of said mixed anhydride by contacting the anhydride at a low temperature with a weak tertiary base in the presence of both haloformic acid ester and water thereby yielding the ester of the penicillanic acid with the said alcohol or phenol.

4 Claims, No Drawings

PREPARATION OF ESTERS OF PENICILLANIC ACIDS

This application is a continuation-in-part of our co-pending application Ser. No. 37879 filed May 15, 1970 and now abandoned.

This invention is concerned with a novel process for the preparation of esters of penicillin compounds.

The penicillin compounds referred to in this specification are generally named with reference to penicillanic acid which has the structure:

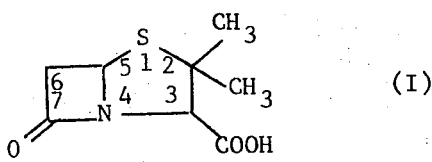 (I)

BACKGROUND OF THE INVENTION

In transformations of penicillin compounds it is frequently necessary to protect the carboxyl group at the 3-position during the reactions. The protective group is one which can conveniently be removed at a later stage in the synthesis. Protective groups of this character include trichloroethyl, diphenylmethyl, p-methoxybenzyl, t-butyl, p-nitrobenzyl, and p-methoxyphenyl.

Penicillin esters are important intermediates in the conversion of penicillins to cephalosporins, for example by the process described in United States Patent Specification No. 3,275,626, i.e., by heating a penicillin oxide under acid conditions to a temperature of from about 100°C to about 175°C. During the process the 3-carboxy group of the penicillin is protected by esterification until after the desired cephalosporin has been prepared and thereafter the ester group is cleaved. This method provides an important route to cephalosporin antibiotics.

It is clearly desirable that such protective ester groups may be introduced as effectively as possible. Where standard methods of esterification are unsatisfactory a method of synthesising esters frequently employed is to condense a haloformate with a carboxylic acid in the presence of a base to form the corresponding mixed anhydride and to heat the latter in solution to effect decarboxylation. Thus, in South African Patent No. 67/1260 there is a description of the esterification of 6-[N-(2,2,2-trichloroethylcarbonyl)-D-2-amino-2-phenylacetamido]penicillanic acid 1-oxide in which the latter is dissolved in dry tetrahydrofuran containing 2 molar equivalents of pyridine. The solution so obtained is cooled in an ice alcohol bath and stirred while a solution of 2,2,2-trichloroethylchloroformate (1.5 molar equivalents) in tetrahydrofuran is added. The mixture is stirred in the cold for 2 hours, at room temperature for 3 hours and is finally heated under reflux for 15 minutes. After working up the mixture in a conventional way, a yield of about 52 percent of crude 2,2,2-trichloroethyl ester is obtained that requires further crystallisation for preparation of pure material.

SUMMARY OF THE INVENTION

We have found, however, that the formation of the mixed anhydride of a penicillanic acid occurs satisfactorily in the cold, i.e., from about −20° to about +30°C, by reaction of the haloformate, viz chloroformate or bromoformate, with a solution (or suspension) of the penicillin compound in an inert, substantially anhydrous, organic solvent, the reaction being effected in the presence of approximately 1 molar equivalent of base. The latter may be present in the reaction mixture by using a penicillin salt of a base or where the penicillin compound used is not a salt of a base by adding to the reactants the stated quantity of base. Lower overall yields are obtained if excess base, e.g. 2 molar equivalents, is present during the formation of the mixed anhydride.

For the next step in the operation, that is, the decomposition of the mixed anhydride by decarboxylation, we have found that, provided a weak tertiary base such as pyridine (or an alkyl pyridine base such as picoline, a lutidine or a collidine) is added after formation of the mixed anhydride, it is unnecessary to heat the mixture to effect decarboxylation as this proceeds satisfactorily and very rapidly in the cold (i.e., from about −20° to about +50°C). If desired the reaction temperature can be increased; however, the effect of heat treatment appears to be the liberation of carbon dioxide that has been formed and has dissolved in the reaction medium. In our experience it is difficult to effect decarboxylation by heat treatment alone in the absence of added base. Bases other than pyridine or alkyl pyridines, particularly strong organic bases such as N-ethyl piperidine or triethylamine, when used in the decarboxylation reaction give poor yields.

Moreover, the yield of the desired ester can be improved by having present in the decarboxylation reaction both haloformic acid ester and water. The haloformic acid ester can be provided by using an excess in the formation of the mixed anhydride while the water can be provided by using an inert solvent containing a residual amount of water even though the solvent is, for practical purposes substantially anhydrous.

DESCRIPTION OF THE PREFERRED EMBODIMENTS

Penicillanic Acid Salt

The penicillanic acid salt used in the preparation of the mixed anhydride according to the invention may have the formula:

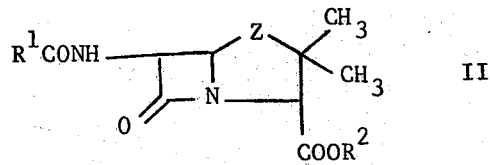 II where $R^1CO$ is an acyl group; $R^2$ is an alkali metal atom, e.g. sodium or potassium, or an organic ammonium group e.g. tri(lower alkyl) ammonium, (e.g. triethylammonium), piperidinium, and N-(lower alkyl) piperidinium ((e.g. N-ethylpiperidinium) or benzylammonium and Z is S, SO or $SO_2$.

It will be appreciated that formula (II) is not inclusive of all penicillanic acid salts and that other such salts may be used in the process according to the invention.

In place of a preformed penicillanic acid salt one may use a free acid and base in approximately molar equivalent amounts as described above. However it will generally be convenient to use a preformed salt and the reaction will hereinafter be described with reference to such salts, it being understood that the alternative procedure may be used if desired.

Certain salts e.g. alkali metal salts may not have the required solubility in the chosen reaction medium. In some circumstances a minor amount of an organic base e.g. ca 0.2 molar equivalent may be added to facilitate dissolution.

HALOFORMIC ACID ESTER

The haloformic acid ester used will ordinarily be formed from an alcohol or phenol, the ester moiety of which can readily be removed, from the penicillin or cephalosporin compound e.g. by hydrolysis, by reduction, or by hydrogenolysis at some convenient stage.

An alcohol residue which may be readily split off is 2,2,2-trihalogenoethyl e.g. 2,2,2-trichloroethyl which may be removed by zinc/acetic acid, zinc/formic acid, zinc/lower alcohol or zinc/pyridine.

Another method of subsequently removing ester groups involves acid hydrolysis and a group which may be removed by acid hydrolysis is tertiary butyl.

FORMATION OF MIXED ANHYDRIDE

The reaction of the penicillanic acid salt with the haloformic acid ester is effected in an inert, substantially anhydrous organic solvent. We have found that methylene chloride is a very useful solvent for this purpose but other halogenated hydrocarbons may be used including chloroform and 1,2-dichloroethane. Other solvents which may be used include ketones e.g. acetone; aromatic hydrocarbons e.g. benzene; and acyclic and cyclic ethers e.g. tetrahydrofuran. Mixtures of solvents may be used if desired. Conveniently the organic solvent should have a boiling point below 100°C. It is not necessary for the reactants to be wholly in solution.

We have further found that for high yields of the final ester it is desirable to add the haloformate very quickly (e.g. over a period not greater than 1 minute) to the solution (or suspension) of the penicillin salt in the organic solvent. In order to overcome the difficulty of rapid addition on large scale manufacture it is however advantageous to add the penicillin salt either as a solid or as a slurry to a solution of the haloformate in the organic solvent.

The haloformate and the penicillin salt may be used in equimolar amounts. Since however residual haloformate participates in the subsequent decarboxylation reaction it is desirable to use from about 0.1 – about 0.9, preferably from about 0.3 to about 0.5, molar equivalent excess, based on the penicillin, of haloformate in the formation of the mixed anhydride.

Although the formation of the mixed anhydride is a rapid reaction, it is very desirable in order to obtain optimum yields for this reaction to go to completion before the next step in the operation is performed. The rate of reaction depends on at least two factors, the concentration of the penicillin salt and the temperature employed. When using a concentration of about 10 percent the reaction appears to require about 5–10 minutes at a temperature of about −15°C after all the penicillin salt has been added to the solution of the haloformate. However at higher concentrations the reaction requires longer times. For example, at 80 percent concentration, 40–60 minutes is required at −15°C for complete reaction whilst 20–30 minutes is required at 0°C.

FORMATION OF ESTER BY DECARBOXYLATION

It is not necessary to recover the mixed anhydride from the reaction medium before effecting decarboxylation and it is unnecessary to heat the mixture i.e., the decarboxylation with the aid of the weak tertiary base can be effected at approximately the same temperature as that employed for the mixed anhydride formation. In general, temperatures from about −20°C to about +50°C, preferably from about −10°C to about +30°C, will be found satisfactory.

The weak tertiary base used in the decarboxylation stage may be employed in an amount of from about 0.25 molar equivalents upwards calculated on the penicillin compound. The weak tertiary base conveniently has a pKa (measured in water at 25°C) of 6.5 or less.

Conveniently the weak tertiary base is pyridine but other aromatic heterocyclic bases may be used including quinoline, isoquinoline, and homologues thereof, for example the alkyl substituted pyridines and quinolines e.g. picolines, lutidines and methyl quinolines.

For optimum yields during the decarboxylation reaction, it is highly desirable for water to be present. Good yields have been obtained when from about 0.03 to about 0.3 equivalents, based on the penicillin, of water are present in the solvent medium before the addition of the weak tertiary base.

In some solvents, e.g. methylene chloride, the necessary water may be associated with the solvent before the formation of the mixed anhydride provided that the solvent is still substantially anhydrous i.e., containing less than about 1 percent of water. It is believed that the water participates in the reaction.

Moreover, it is advantageous to have from about 0.1 to about 0.9, preferably from about 0.3 to about 0.5, molar equivalents of haloformate present with the water. The haloformate apparently participates in the decarboxylation reaction. The haloformate may be derived from excess added in the mixed anhydride formation or may be added prior to or during the decarboxylation reaction e.g. as a complex with the weak tertiary base as described below.

When using solutions containing 50% and greater of the mixed anhydride the decarboxylation reaction may become rather uncontrollable when the weak tertiary base is added to the mixed anhydride solution. For example, after ca. 0.3 mole of pyridine is added to a 60 percent solution of 2,2,2-trichloroethyloxycarbonyl 6-β-phenylacetamidopenicillanate a delayed reaction sets in and the temperature rises, even with external cooling, from −15° to 20°–22°C with accompanying, extremely rapid, evolution of carbon dioxide. Considerable entrainment of the solvent results and this is highly disadvantageous.

However, a more controlled system is obtained if the solution of the mixed anhydride is added to the weak tertiary base, e.g. in solution in an inert organic solvent e.g. a halogenated hydrocarbon.

This method is not only more readily controlled than is the case when the weak tertiary base is added to the mixed anhydride solution but also in general an increase in yield is obtained. This process is also effective at concentrations below 50 percent (where the question of control may not be a significant factor) although it may be found that some diminution of yield occurs. Hence by using this method in conjunction with high concentration solutions of mixed anhydride in the organic solvent one is able to achieve a number of advantages leading to increased yield of end-product viz. increased throughput on the plant, reduced solvent requirements, and greater control over the decarboxylation reaction enabling the attainment of consistently high yields.

A more controlled system can also be obtained if the solution of the mixed anhydride is added to a suspension of a complex of the weak tertiary base with the excess haloformic acid ester in an inert organic solvent e.g. a halogenated hydrocarbon.

The complex is obtained on admixture of strong solutions of equimolar quantities of the haloformic acid ester and the tertiary base in a halogenated hydrocarbon e.g. methylene chloride when the complex is deposited as a white solid. It is thermally unstable as judged by colour formation at temperatures over 0° and is extremely sensitive to moisture, decomposing vigorously.

The desired ester may then be recovered from the reaction mixture. Alternatively further reactions may be effected in the solution e.g. conversion of a compound of formula (II) where $Z = S$ to a penicillin oxide by the method of Chow, Hall and Hoover (J. Org. Chem. 1962, 27, 1381). The penicillin ester is contacted with a suitable oxidising agent in an amount such that at least one atom of active oxygen is present per atom of thiazolidine sulphur. Suitable oxidising agents include metaperiodic acid, peracetic acid and permonophthalic acid. The resulting penicillin oxide may be recovered from the reaction mixture.

The penicillin salt of formula (II) conveniently has an acyl group ($R^1CO$) at the 6$\beta$-position which is that of a penicillin obtained by a fermentation process e.g. phenylacetyl or phenoxyacetyl.

Alternatively, the acyl group at the 6$\beta$-position of the penicillin salt of formula (II) may be that desired in the cephalosporin compound obtained on transformation of the penicillin compound e.g. a thienylacetyl or phenylglyoxylyl group, or it may be a precursor for the desired acyl group e.g. an acyl group containing a protected functional group such as a protected amino group. An example of such an acyl group is a protected $\alpha$-aminophenylacetyl group.

In order that the invention may be well understood the following examples are given by way of illustration only:

EXAMPLE 1

Methylene chloride (50 litres) which had been washed twice with water and dried with sodium sulphate and which had the water content adjusted to 0.1 percent was cooled to −15°C. With stirring 2,2,2-trichloroethyl chloroformate (2.15 litres) was added and then 6$\beta$-phenylacetamidapenicillanic acid N-ethylpiperidine salt (5 kg) was added over 10 minutes. After stirring for 5 minutes, by which time all the salt had gone into solution, pyridine (1.25 litres) was added quickly. There was an effervescence and the temperature rose to 0°. The solution was washed with dilute sulphuric acid solution, sodium bicarbonate solution and water and each wash re-extracted successively with methylene chloride. To the combined organic solvent layers a solution of peracetic acid in acetic acid (2.32 litres., 40 percent) was added over 12 minutes with water cooling. After stirring for 30 minutes the methylene chloride solution was washed with water, sodium bicarbonate and water and each wash was re-extracted successively with methylene chloride. The combined organic layers were evaporated to small bulk (12.5 litres), methyl alcohol (26 litres) added and distillation continued to a volume of 26 litres. After cooling to −5° for 18 hours, the product was filtered off, washed with methyl alcohol, slurried in ether and refiltered and dried at 40°. The 2,2,2-trichloroethyl 6$\beta$-phenylacetamido-penicillanate 1$\beta$-oxide weighed 4.788 kg. (89.07 percent). m.p. 170°–173°; $[\alpha]_D^{20°} = +179.4°$. From the methyl alcoholic liquors a further 2 percent of product was obtained.

EXAMPLE 2

To a solution of 6$\beta$-phenylacetamidopenicillanic acid N-ethyl piperidine salt (22.4 g.) in methylene chloride (250 ml) which had been washed with water and contained 10 percent diethyl ether and 0.1 percent water, stirred and cooled to 0°, 2,2,2-trichloroethyl chloroformate (9.8 ml) was added quickly, followed 2 minutes later by pyridine (5 ml.). After stirring for 5 minutes at 0°, a 2 percent solution of sulphuric acid in water was added. The mixture was separated and the methylene chloride layer washed with sodium bicarbonate solution and water. Each of the aqueous washes were re-extracted successively with methylene chloride. The combined organic layers were stirred and, with water cooling, a solution of monoperphthalic acid in ether (40 ml., 1.5 M) was added over 10 minutes. The solution was washed with sodium bicarbonate solution (x2) and water and the washes reextracted successively with methylene chloride. The combined methylene chloride solution were evaporated to small bulk, methyl alcohol (120 ml) added and the residual methylene chloride boiled off. The product 2,2,2-trichloroethyl 6$\beta$-phenylacetamidopenicillanate 1$\beta$-oxide was allowed to crystallise at 0° overnight, filtered and washed with methyl alcohol and ether and dried at 40°. Yield = 19.61 g. (81.3 percent m.p. 169°–71°).

EXAMPLE 3

To a solution of 2,2,2-trichloroethyl chloroformate (9.8 ml) in methylene chloride (250 ml., 0.03 percent $H_2O$) stirred and cooled to 0°, 6$\beta$-phenylacetamidopenicillanic acid N-ethyl piperidine salt (22.4 g) was added over 10 minutes followed by 0.1 ml water (total water content = 0.07 percent). After stirring for 5 minutes, pyridine (5 ml) was added and the mixture worked up and oxidised as in Example 2. Yield = 20.54 g (85.3 percent) of 2,2,2-trichloroethyl 6$\beta$-phenylacetamidopenicillanate 1$\beta$-oxide.

EXAMPLE 4

To a solution of 6$\beta$-phenylacetamidopenicillanic acid N-ethyl piperidine salt (22.4 g) in methylene chloride (250 ml, water content 0.06 percent), stirred and cooled to 0°, 2,2,2-trichloroethylchloroformate (9.8 ml) was added quickly, followed two minutes later by $\alpha$-picoline (6 ml). After stirring for 5 minutes, the mixture was heated under reflux for 15 minutes, cooled and worked up and oxidised as in Example 2. Yield = 18.4 kg (76.3 percent) of 2,2,2-trichloroethyl 6$\beta$-phenylacetamidopenicillanate 1$\beta$-oxide m.p. 167° − 70°.

EXAMPLE 5

Following the procedure of Example 4 but using β-picoline in place of α-picoline gave 18.24 (75.6 percent) of product.

EXAMPLE 6

Following the procedure of Example 4 but using 2,4,6-collidine (8.3 ml) gave a yield of 17.94 g (74.4 percent).

EXAMPLE 7

To methylene chloride (250 ml; 0.09 percent water) cooled to −20°. 2,2,2-trichloroethylchloroformate (9.8 ml.) was added, followed by pyridine (0.7 ml). At −15° potassium 6β-phenylacetamidopenicillanate (18.7 g) was added over 4 minutes. After a further 8 minutes, pyridine (5 ml) was added and then the reaction mixture worked up as in Example 2. A yield of 20.94 g (86.9 percent) m.p. 171°–174° was obtained.

EXAMPLE 8

To methylene chloride (250 ml; 0.09 percent water) cooled to −20°, 2,2,2-trichloroethylchloroformate (9.8 ml) and N-ethylpiperidine (1.2 ml) were added. After stirring for 3 minutes, potassium 6β-phenylacetamidopenicillanate (18.7 g) was added and after 5 minutes, pyridine (5 ml) added. The reaction mixture was worked up as in Example 2 to give 20.26 g. (84.3%) of product.

EXAMPLE 9

Methylene chloride (150 ml. 0.08 percent $H_2O$), water (0.92 ml.) and 2,2,2-trichloroethyl chloroformate (52.5 ml., 1.42 equiv.) were mixed, stirred and cooled to −15°. 6β-Phenylacetamidopenicillanic acid N-ethylpiperidine salt (120 g., 0.268 mole) was added over 4 minutes and the slurry stirred at −15° for 1 hour. The resulting solution was then added over 14 minutes to a solution of pyridine (21.5 ml., 1 equiv.) in methylene chloride (50 ml. 0.08 percent $H_2O$) at between −10° and −15°. The reaction mixture was stirred at −15° for 15 minutes. 12 percent sulphuric acid (100 ml.) added with cooling and the phases separated. The methylene chloride solution was then washed with 10 percent $NaHCO_3$ solution (120 ml.) with back extraction of the aqueous phase with methylene chloride. The bulked organic solutions were oxidised with peracetic acid (57 ml; 40 percent solution in acetic acid), added slowly with cooling to keep the temperature below 20°. After stirring a further 15 minutes, the reaction mixture was worked up by washing (2 × 100 ml. $H_2O$, 1 × 120 ml. 10 percent $NaHCO_3$ — caution — and 1 × 100 ml. $H_2O$). The methylene chloride solution was concentrated, methanol (240 ml.) added and distillation continued until the vapour temperature was 62°. After standing overnight in the cold room, the product was collected by filtration, washed with methanol, slurried with ether and dried in vacuo at 40° to give 122.7 g. (95 percent theory) of 2,2,2-trichloroethyl 6β-phenylacetamidopenicillanate 1β-oxide (m.p. 170°–172°).

EXAMPLE 10

Methylene chloride (200 ml.; 0.08 percent $H_2O$), water (0.9 ml.) and 2,2,2-trichloroethyl chloroformate (40 ml.; 1.1 equivs) were mixed, stirred and cooled to −15°. 6β-Phenylacetamidopenicillanic acid N-ethyl piperidine salt (120 g.) was added over 5 minutes and the mixture stirred for one hour. Meanwhile pyridine (21.5 ml; 1 equiv.) was added dropwise to a stirred solution of 2,2,2-trichloroethyl chloroformate (12.5 ml; 0.32 equivs) in methylene chloride (50 ml.) at −15°. The mixed anhydride was added to the suspension of the complex at −15° to −10° and after stirring for 15 minutes the product was isolated after washing and oxidation as in Example 9 to give 2,2,2-trichloroethyl 6β-phenylacetamidopenicillanate 1β-oxide (12.05 g., 86.8 percent theory) m.p. 171°–175°.

EXAMPLE 11

Methylene chloride (150 ml; 0.08 percent water) and 2,2,2-trichloroethyl chloroformate (52.5 ml; 1.42 equv) were mixed and cooled to −15° and with stirring 6β-phenylacetamidopenicillanic acid N-ethyl piperidine salt (120 g.) added over 5 minutes. After stirring for one hour the solution was added to a solution of pyridine (21.5 ml. 1 equiv.) and water (0.92 ml) in methylene chloride (50 ml.) keeping the temperature between 25° and 30°. After 15 minutes stirring the product waw isolated after washing and oxidation as in Example 9 to give 2,2,2-trichloroethyl 6β-phenylacetamidopenicillanate 1β-oxide (121.7 g; 94.2 percent theory) m.p. 171°–173°.

EXAMPLE 12

Potassium 6β-phenoxyacetamidopenicillanate (100 g., 258 mmole) was added to a solution of 2,2,2-trichloroethyl chloroformate (50 ml., 362 mmole, 1.4 equiv.) in dry methylene chloride (500 ml.) which had been cooled to −20°. The temperature was allowed to rise to 0° over ½ hour, then water (1 ml., 55.6 mmole, 0.215 eq.) was added and the mixture cooled again to −20°. Pyridine (20 ml., 248 mmole) was added slowly and then the mixture was gradually warmed to reflux over 1½ hours and held at reflux for 1 to 2 minutes. The solution was cooled to room temperature and washed with dilute hydrochloric acid, then dried and cooled to 5° and treated with peracetic acid (68 ml. of a solution in acetic acid containing 5.57 mmole per ml., 379 mmole; 1.44 equiv.) over 15 minutes so that the temperature did not exceed 10°. The slightly yellow solution was washed with water (2 × 100 ml.) and dilute sodium bicarbonate solution (3 × 100 ml.), then dried ($MgSO_4$) and evaporated to a pale-yellow syrup. Methanol (200 ml.) was added and the solution evaporated to ca. 100 ml., when a white solid began to crystallise. After chilling overnight the solid was isolated by filtration, washed with ether and dried in vacuo to give 2,2,2-trichloroethyl 6β-phenoxyacetamidopenicillanate 1β-oxide (111.8 g., 225 mmole, 87 percent), m.p. 147° to 148.5°, $[\alpha]_D^{24} + 160.4°$ (c 1.17, chloroform). The mother liquors were evaporated to low volume and chilled to provide a second crop which was collected by filtration, washed with ether, and dried in vacuo (3.084 g., 6.18 mmole, 2.4 percent), m.p. 142°–143°, $[\alpha]_D^{23} + 151.5°$ (c 1.02, chloroform).

EXAMPLE 13

Methylene chloride (350 ml, 0.02 percent w/v $H_2O$) and 6β-phenylacetamidopenicillanic acid 1β-oxide (137 g) were slurried, stirred and cooled to 0°C. Triethylamine (54.4 ml was added over 5 mins. maintaining a reaction temperature of 0°. The solution was stirred, and cooled over 10 mins. to −5° and was then added over 15 mins. to a solution of 2,2,2-trichloroethyl chloroformate (75.25 ml) in methylene chloride (150 ml) at −5°C, keeping the temperature at −5°. The reaction mixture was stirred at this temperature for 5 mins. and was then added over 10 mins. to a mixture of pyridine (43.7 ml) and water (1.75 ml) stirred at −9°. During this addition the temperature of the reaction mixture rose to +2° and a white solid was precipitated (base hydrochloride). After stirring for 15 mins. the reaction mixture was washed with aqueous sulphuric acid (200 ml) 29.5 percent aqueous sodium bicarbonate solutions (200 ml 7 percent w/v) and water (200 ml). The aqueous phases were back extracted sequentially with methylene chloride (80 ml). The bulked organic phase was worked up as in Example 1 to yield 170.5 g (90.5 percent theory) of 2,2,2-trichloroethyl 6β-phenylacetamidopenicillanate 1β-oxide.

EXAMPLE 14

A solution of 6β-phenylacetamidopenicillanic acid N-ethylpiperidine salt (22.4 g) in chloroform (250 ml; washed twice with water and dried over sodium sulphate to a moisture content of 0.033 percent; 0.09 equivalents) was cooled to 0° and trichloroethylchloroformate (9.8 ml; 1.42 equivalents) added quickly, followed by pyridine (5 ml). After stirring for 5 minutes at 0°, 2 percent sulphuric acid solution was added. The mixture was separated and the chloroform layer washed with sodium bicarbonate solution and water and each wash re-extracted successively with chloroform. To the combined organic solvent layers a solution of monoperphthalic acid in ether (400 ml; 1.5M) was added over 5 minutes. After stirring for 30 minutes the chloroform solution was washed with water, sodium bicarbonate and water and each was re-extracted with chloroform. The combined organic layers were evaporated to dryness and the residue crystallised from methylene chloride/methanol to give 2,2,2-trichloroethyl 6β-phenylacetamidopenicillanate 1β-oxide 18.92 g (78.5 percent theory). m.p. 167°–169°.

EXAMPLE 15

A solution of 6β-phenylacetamidopenicillanic acid N-ethylpiperidine salt (22.4 g) in 1,2-dichloroethane (washed twice with water and dried over sodium sulphate to a moisture content of 0.12 percent, 0.3 equivalents) was cooled to 0° and trichloroethyl chloroformate (9.8 ml; 1.42 equivalents) added quickly followed by pyridine (5 ml). After stirring for four minutes the reaction was worked up, oxidised and crystallised as in the previous example to give 2,2,2-trichloroethyl 6β-phenylacetamidopenicillanate 1β-oxide 18.7 g (77.7 percent theory) m.p. 171°–173°.

We claim:

1. A process for the preparation of a 2,2,2-trichloroethyl or t-butyl ester of a penicillanic acid of the formula

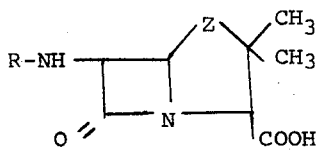

wherein R is phenylacetyl, phenoxyacetyl, thienylacetyl, phenylglyoxylyl or protected α - aminophenylacetyl and Z is S, SO or $SO_2$ which comprises contacting an alkali metal, tri (lower alkyl) ammonium, piperidinium, N-(lower alkyl) piperidinium or benzylammonium salt of said penicillanic acid with a chloroformic or bromoformic acid ester of 2,2,2-trichloroethanol or T-butanol in an inert, substantially anhydrous organic solvent selected from the group consisting of methylene chloride, chloroform, 1,2-dichloroethane, acetone, benzene, tetrahydrofuran and mixtures thereof at a temperature between about −20° and about +30°C, in the absence of any base other than is necessary to bring the penicillanic acid salt into solution, to form the corresponding mixed anhydride and then effecting decarboxylation of said mixed anhydride by contact with a weak tertiary base selected from the group consisting of pyridine and lower alkyl pyridines at a temperature from about −20° to about +50°C, the decarboxylation being effected in the presence of from about 0.1 to about 0.9 molar equivalents, based on the penicillin, of said chloroformic or bromoformic acid ester and from about 0.03 to about 0.3 molar equivalents, based on the penicillin, of water.

2. A process for the preparation of a 2,2,2-trichloroethyl or t-butyl ester of a penicillanic acid

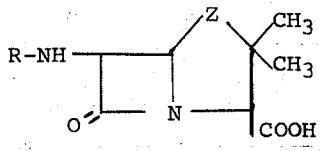

wherein R is phenylacetyl, phenoxyacetyl, thienylacetyl, phenylglyoxylyl or protected α - aminophenylacetyl and Z is S, SO or $SO_2$ which comprises adding an alkali metal, tri (lower alkyl) ammonium, piperidinium, N-(lower alkyl) piperidinium or benzylammonium salt of said penicillanic acid as a solid or as a slurry in an inert, substantially anhydrous organic solvent selected from the group consisting of methylene chloride, chloroform, 1,2-dichloroethane, acetone, benzene, tetrahydrofuran and mixtures thereof to a solution of a chloroformic or bromoformic acid ester of 2,2,2-trichloroethanol or t-butanol in said solvent at a temperature between about −20° and about +30°C, in the absence of any base other than is necessary to bring the penicillanic acid salt into solution, to form the corresponding mixed anhydride and then effecting decarboxylation of said mixed anhydride by contact with a weak tertiary base selected from the group consisting of pyridine and lower alkyl pyridines at a temperature from about −20° to about +50°C.

3. A process as defined in claim 2 wherein the decarboxylation is effected in the presence of from about 0.1 to about 0.9 molar equivalents, based on the penicillin, of said chloroformic or bromoformic acid ester and from about 0.03 to about 0.3 equivalents, based on the penicillin, of water.

4. A process as defined in claim 1 wherein the decarboxylation is effected by adding said mixed anhydride in solution in said organic solvent to said weak tertiary base as such or as a solution thereof in said solvent.

* * * * *